US008989760B2

(12) United States Patent
Tokgoz et al.

(10) Patent No.: US 8,989,760 B2
(45) Date of Patent: Mar. 24, 2015

(54) USING LOW-POWER ACCESS POINTS TO IDENTIFY TRAFFIC CONGESTION ZONES

(71) Applicant: QUALCOMM Incorporated, San Diego, CA (US)

(72) Inventors: Yeliz Tokgoz, San Diego, CA (US); Mehmet Yavuz, San Diego, CA (US); Farhad Meshkati, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 13/783,712

(22) Filed: Mar. 4, 2013

(65) Prior Publication Data

US 2013/0237202 A1 Sep. 12, 2013

Related U.S. Application Data

(60) Provisional application No. 61/609,217, filed on Mar. 9, 2012.

(51) Int. Cl.
*H04W 72/00* (2009.01)
*H04W 28/02* (2009.01)
(Continued)

(52) U.S. Cl.
CPC ........ *H04W 28/0289* (2013.01); *H04W 84/045* (2013.01); *H04W 36/0083* (2013.01); *H04W 24/02* (2013.01)
USPC ........ 455/453; 455/436; 455/443; 455/452.1; 455/452.2

(58) Field of Classification Search
CPC .................... H04W 52/0203; H04W 52/0216; H04W 84/18; H04W 84/20; H04W 28/02; H04W 48/06; H04W 48/20; H04W 88/08; H04W 72/1278; H04W 84/045; H04W 24/02; H04W 28/0289; H04W 36/083
USPC ........ 455/414.1, 446, 449, 450, 452.1, 452.2, 455/453, 454
See application file for complete search history.

(56) References Cited

U.S. PATENT DOCUMENTS 6,094,580 A 7/2000 Yu et al.
6,539,221 B1 3/2003 Vasudevan et al.
(Continued)

FOREIGN PATENT DOCUMENTS

EP 1895801 A1 3/2008
WO 2012130410 A1 10/2012

OTHER PUBLICATIONS

International Search Report and Written Opinion—PCT/US2013/030022—ISA/EPO—Aug. 29, 2013.

*Primary Examiner* — Jean Gelin

(57) ABSTRACT

Low-power access points are used to identify traffic congestion zones in a network. The low-power access points collect metrics that are used identify high demand areas. The locations of the traffic congestion zones are then determined based on the locations of the low-power access points that identified high demand. In some embodiments, metrics are collected and processed in a distributed fashion at each femtocell. Each femtocell then outputs an indication of high demand in the area and/or takes action to address the high demand at an identified traffic congestion zone. Alternatively, the femtocells may collectively take action to address the high demand at one or more identified traffic congestion zones. In other embodiments, metrics may be collected from the femtocells at a central entity and processed to identifying any traffic congestion zones near the femtocells, whereby the central entity takes appropriate action to address the high demand.

76 Claims, 13 Drawing Sheets

(51) Int. Cl.
 *H04W 24/02* (2009.01)
 *H04W 84/04* (2009.01)
 *H04W 36/00* (2009.01)

(56) References Cited

U.S. PATENT DOCUMENTS 8,254,959 B2  8/2012  Fix et al.
2007/0291732 A1* 12/2007 Todd et al. .................... 370/351
2008/0181184 A1*  7/2008 Kezys .......................... 370/338
2009/0046665 A1   2/2009 Robson et al.
2010/0124930 A1   5/2010 Andrews et al.
2010/0254319 A1  10/2010 Karaoguz et al.
2011/0170496 A1*  7/2011 Fong et al. .................... 370/329
2012/0063373 A1   3/2012 Chincholi et al.
2013/0109390 A1*  5/2013 Tokgoz et al. ................ 455/436
2013/0210409 A1*  8/2013 Grayson ....................... 455/418

* cited by examiner

USING LOW-POWER ACCESS POINTS TO IDENTIFY TRAFFIC CONGESTION ZONES

CLAIM OF PRIORITY

This application claims the benefit of and priority to commonly owned U.S. Provisional Patent Application No. 61/609,217, filed Mar. 9, 2012, the disclosure of which is hereby incorporated by reference herein.

BACKGROUND

1. Field

This application relates generally to wireless communication and more specifically, but not exclusively, to traffic congestion control.

2. Introduction

A wireless communication network may be deployed over a defined geographical area to provide various types of services (e.g., voice, data, multimedia services, etc.) to users within that geographical area. In a typical implementation, access points (e.g., corresponding to different macrocells) are distributed throughout a network to provide wireless connectivity for access terminals (e.g., cell phones) that are operating within the geographical area served by the network.

In practice, user (e.g., user access terminal) distribution and demand for wireless connectivity is typically not uniformly distributed throughout the area served by the network. For example, there may be areas with much higher user density than average, or locations where the data demand from users is above average. These so-called traffic congestion zones (or hot spots) generally require special solutions to maintain a similar type of user experience as the rest of the network. However, it is difficult for network planners to accurately identify the congestion zones since network planners conventionally monitor loading on a macrocell level.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to using low-power access points to identify traffic congestion zones (hot spots) in a network (e.g., within a defined coverage area of a wireless network). For example, the low-power access points may collect metrics that are then used to identify high traffic demand areas. The locations of the traffic congestion zones may thus be determined based on the locations of the low-power access points that identified high traffic demand in their local vicinity.

In some embodiments, one or more of these metrics may be collected and processed in a distributed fashion at each femtocell. In this case, each femtocell may output an indication of high demand in the area and/or take action to address the high demand at an identified traffic congestion zone. Alternatively, the femtocells may collectively take action to address the high demand at one or more identified traffic congestion zones.

In other embodiments, metrics may be collected from the femtocells at a central entity and processed to identifying any traffic congestion zones near the femtocells. The central entity may then take action to address the high demand at the traffic congestion zone(s).

In view of the above, in some aspects, communication in accordance with the teachings herein involves: receiving information indicative of traffic demand at a plurality of first access points, wherein each of the first access points provides coverage within a corresponding subregion of a coverage area of a second access point, and wherein each of the first access points employs a maximum transmit power that is less than a maximum transmit power employed by the second access point; identifying, based on the received information, at least one of the subregions having traffic demand that is greater than or equal to a traffic threshold; and invoking a procedure to reduce the traffic demand at the identified at least one subregion.

In some aspects, communication in accordance with the teachings herein involves: determining whether traffic demand at a low-power access point is greater than or equal to a traffic threshold; and transmitting a message requesting improvement of at least one communication capability of the low-power access point as a result of the traffic demand determination.

In some aspects, communication in accordance with the teachings herein involves: determining, at a first low-power access point, whether traffic demand at the first low-power access point is greater than or equal to a traffic threshold; communicating with at least one second low-power access point to provide an indication of the traffic demand determination to the at least one second low-power access point; and adjusting at least one communication capability of the first low-power access point in corroboration with the at least one second low-power access point as a result of the communication.

BRIEF DESCRIPTION OF THE DRAWINGS

These and other sample aspects of the disclosure will be described in the detailed description and the claims that follow, and in the accompanying drawings, wherein:

Figure 1:
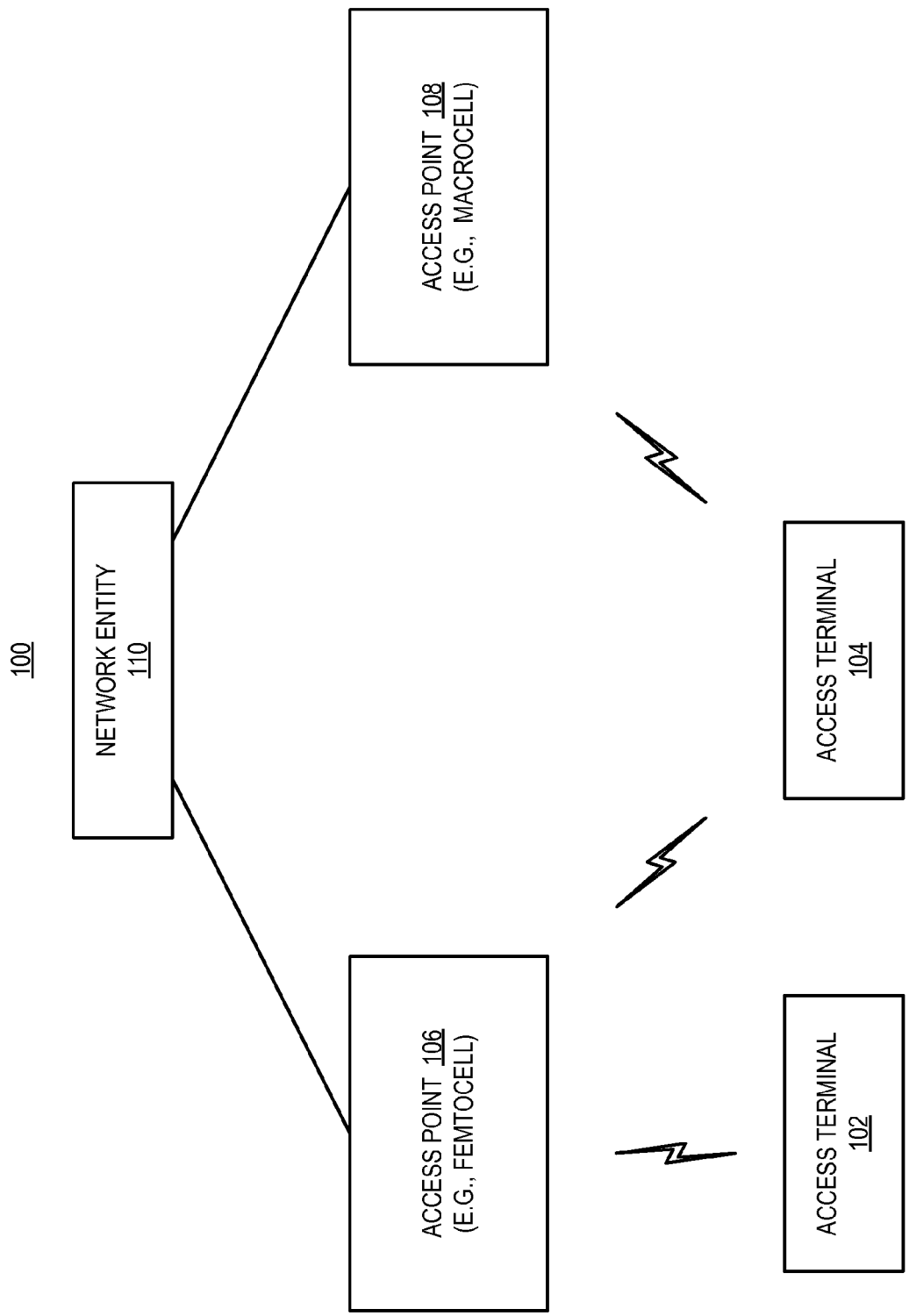
FIG. 1 is a simplified block diagram of a sample embodiment of a communication system including low-power access points.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, macrocells, femtocells, and so on, while access terminals may be referred to or implemented as user equipment (UEs), mobile stations, and so on.

Access points in the system 100 provide access to one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, an access point 108, or some access point in the system 100 (not shown). Similarly, at various points in time the access terminal 104 may connect to the access point 106, the access point 108, or some access point. Each of the access points may communicate with one or more network entities (represented, for convenience, by a network entity 110), including each other (not shown), to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, radio resource management, or some other suitable network functionality. In some aspects, mobility management relates to: keeping track of the current location of access terminals through the use of tracking areas, location areas, routing areas, or some other suitable technique; controlling paging for access terminals; providing access control for access terminals; controlling handover; controlling reselection, and so on. Two of more of these network entities may be co-located and/or two or more of these network entities may be distributed throughout a network.

Some of the access points (e.g., the access points 106 and 108) in a system may comprise low-power access points. Low-power access points may be deployed to supplement conventional network access points (e.g., macro access points), and to provide more robust coverage and higher throughput for access terminals. For example, a low-power access point installed in a user's home or in an enterprise environment (e.g., commercial buildings) may provide voice and high speed data service for access terminals supporting cellular radio communication (e.g. CDMA, WCDMA, UMTS, LTE, etc.).

Such low-power access points may be referred to as, for example, femtocells, femto access points, femto nodes, home NodeBs (HNBs), home eNodeBs (HeNBs), access point base stations, picocells, or pico nodes. Typically, such low-power access points connect to the Internet via a broadband connection (e.g., a digital subscriber line (DSL) router, a cable modem, or some other type of modem) that provides a backhaul link to a mobile operator's network. Thus, for example, low-power access points deployed in user homes provide mobile network access to one or more devices via the broadband connection.

As used herein, the term low-power access points refers to access points having a transmit power (e.g., one or more of: maximum transmit power, instantaneous transmit power, nominal transmit power, average transmit power, or some other form of transmit power) that is less than a transmit power (e.g., as defined above) of any macro access point in a defined coverage area. In some embodiments, each low-power access point has a transmit power (e.g., as defined above) that is less than a transmit power (e.g., as defined above) of the second access point by a relative margin (e.g., 10 dBm or more). In some embodiments, low-power access points such as femtocells may have a maximum transmit power of 20 dBm or less. In some embodiments, low-power access points such as picocells may have a maximum transmit power of 24 dBm or less. It should be appreciated, however, that these or other types of low-power access points may have a higher or lower maximum transmit power in other embodiments (e.g., up to 1 Watt in some cases, up to 10 Watts in some cases, and so on).

For convenience, low-power access points may be referred to as femtocells or femto access points in the discussion that follows. Thus, it should be appreciated that any discussion related to femtocells or femto access points herein may be equally applicable to low-power access points in general (e.g., to picocells, to microcells, to small cells, etc.).

Femtocells may be configured to support different types of access modes. For example, in an open access mode, a femtocell may allow any access terminal to obtain any type of service via the femtocell. In a restricted (or closed) access mode, a femtocell may only allow authorized access terminals to obtain service via the femtocell. For example, a femtocell may only allow access terminals (e.g., so called home access terminals) belonging to a certain subscriber group (e.g., a closed subscriber group (CSG)) to obtain service via the femtocell. In a hybrid access mode, alien access terminals (e.g., non-home access terminals, non-CSG access terminals) may be given limited access to the femtocell. For example, a macro access terminal that does not belong to a femtocell's CSG may be allowed to access the femtocell only if sufficient resources are available for all home access terminals currently being served by the femtocell.

In a typical deployment model, indoor or outdoor femtocells operating in open or hybrid access mode are deployed to provide indoor as well as extended outdoor coverage. Especially for deployments that are on a dedicated carrier, even lower power level (e.g., 100 mW or less) transmissions from an indoor femtocell may provide very good coverage not only within the same building, but also at neighboring buildings, as well as outdoors. By allowing access to other users through adoption of open or hybrid access mode of operation, femtocells may provide service to an extended area and allow users within that area to be offloaded from the macro network.

The disclosure relates in some aspects to using femtocells to identify traffic congestion zones in a network (e.g., within a defined coverage area of a wireless network). Since the coverage region of femtocells is much smaller compared to macrocells, monitoring the user distribution and demand on femtocells allows for better identification of traffic congestion zones.

Figure 2:
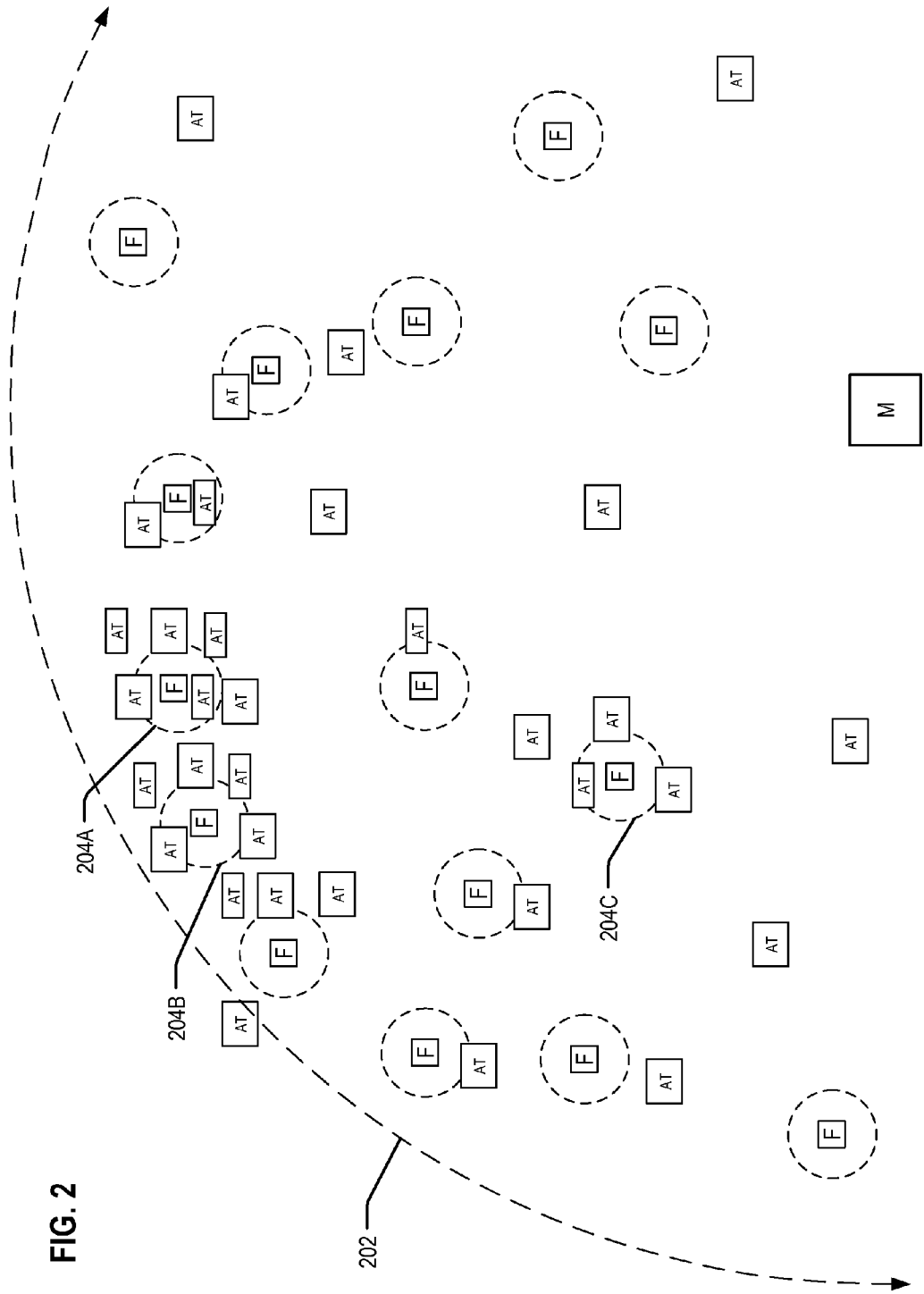
FIG. 2 is a simplified diagram illustrating sample traffic congestion zones in a network that employs low-power access points.

FIG. 2 illustrates a simplified example of a topology where femtocells (represented by the small boxes with the "F" designation) are deployed within the coverage area of one or more macrocells (represented by the small box with the "M" designation). A number of access terminals (represented by the small boxes with the "AT" designation) are present within the coverage area of the macrocell(s) as well.

Coverage areas of the macrocell(s) and the femtocells are represented in a simplified manner by dashed lines in FIG. 2. A dashed semi-circle 202 (with arrows representing that the lines continue to form a complete circle) represents the coverage area of the macrocell(s). Dashed circles 204 (e.g., circles 204A, 204B and 204C) represent the coverage areas of the femtocells. It should be appreciated that due to obstructions and other factors, the coverage area of a cell may not have consistent coverage throughout the area and the coverage area of a cell may not be circular. Hence, the coverage areas depicted in FIG. 2 should be understood as being simply representative of the actual coverage provided by a cell or cells.

As shown in FIG. 2, some areas of the coverage area 202 have a larger number of access terminals than other areas. Also, some of the access terminals in a given area may have higher data demands (e.g., due to the use of video streaming applications or other high bandwidth applications). Consequently, there may be traffic congestion zones in the coverage area 202 associated with these areas of high traffic demand.

In accordance with the teachings herein, low-power access points such as femtocells are used to identify traffic congestion zones in the coverage area of one or more high-power access points (e.g., a macrocell). Sample high-level operations relating to identifying traffic congestion areas and taking appropriate action to address the high demand in these areas will be described in conjunction with the flowchart of FIG. 3.

Figure 3:
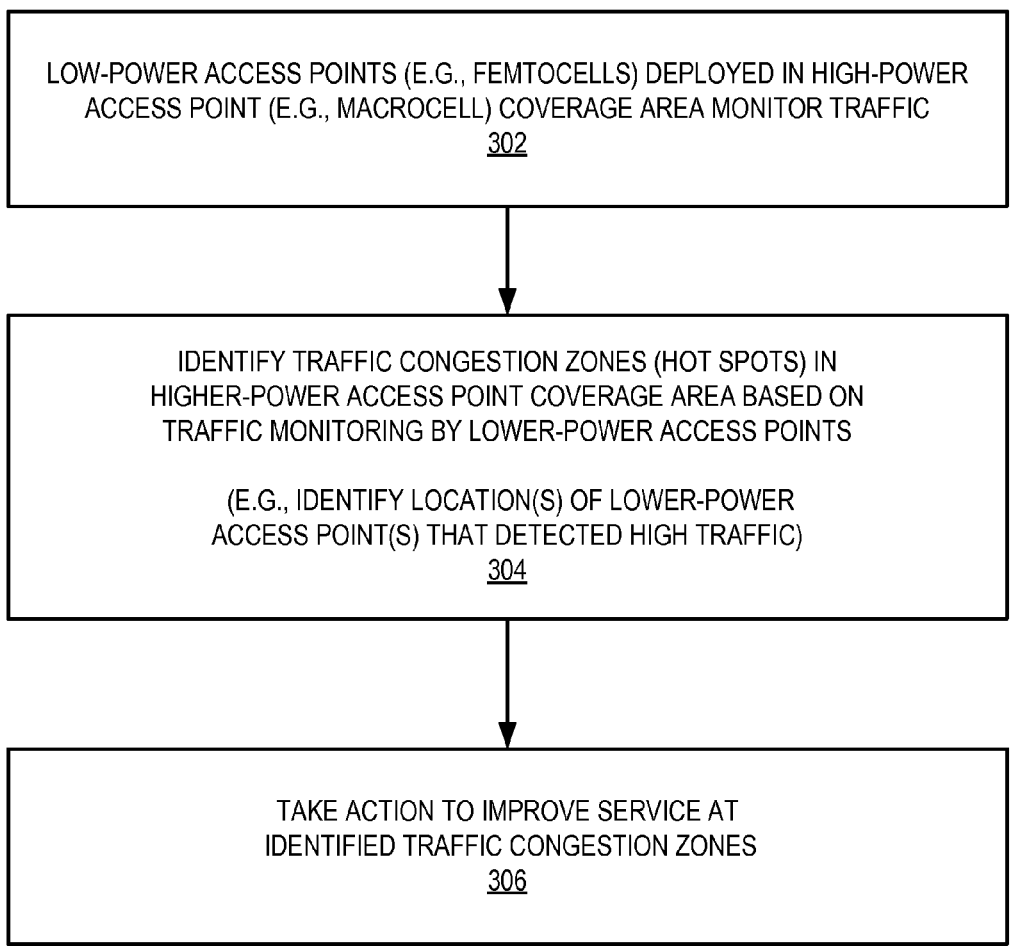
FIG. 3 is a flowchart of several sample aspects of operations that may be performed to address traffic congestion.
Figure 7:
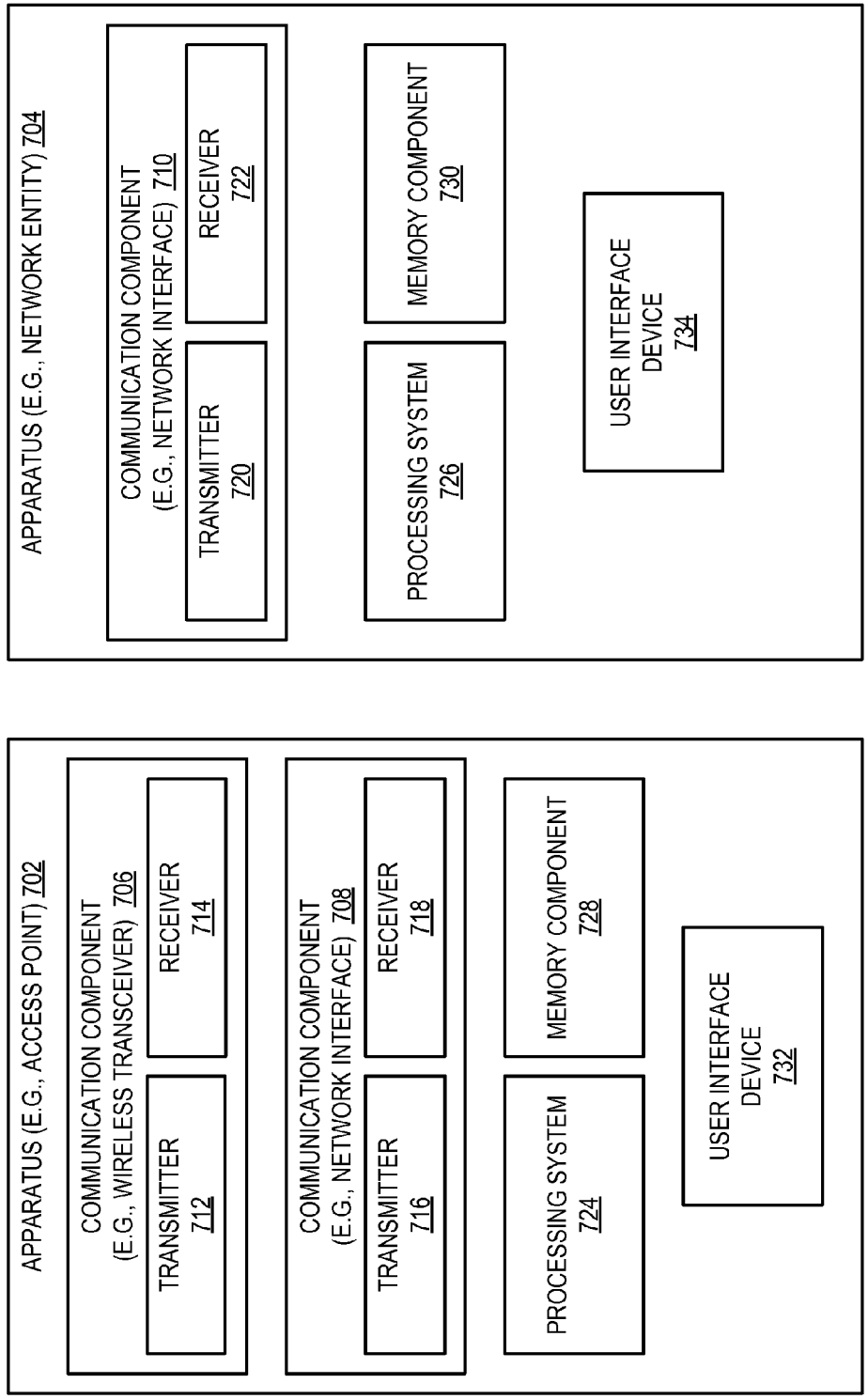
FIG. 7 is a simplified block diagram of several sample aspects of components that may be employed in communication nodes.

For convenience, the operations of FIG. 3 (or any other operations discussed or taught herein) may be described as being performed by specific components (e.g., the components of FIG. 1 or 7). It should be appreciated, however, that these operations may be performed by other types of components and may be performed using a different number of components. It also should be appreciated that one or more of the operations described herein may not be employed in a given implementation.

As represented by block 302, each of the low-power access points (e.g., femtocells) may monitor traffic to acquire various metrics to determine whether there is high traffic demand in the vicinity of femtocell. The locations of the traffic congestion zones within the coverage area 202 may thus be identified by determining the locations of the femtocells that report high traffic demand (e.g., traffic demand that meets or exceeds a demand threshold). For example, in FIG. 2, the femtocell coverage areas 204A, 204B, and 204C may be identified as traffic congestion zones as a result of the monitoring performed by the corresponding femtocells.

Examples of metrics that may used to identify high demand areas include: the number of user registrations at a femtocell; the number of calls at a femtocell; the total data throughput carried over a femtocell per unit time; data throughput per user at a femtocell; data throughput per connection at a femtocell; femto channel element usage statistics; and the percentage of time a femtocell runs into resource limitations (e.g., limitations relating to channel elements, backhaul resources, or airlink resources).

As represented by block 304, any traffic congestion zones within the high-power access point (e.g., macrocell) coverage are identified based on the traffic monitoring conducted by the low-power access points. For example, the location of a given traffic congestion zone may be defined as corresponding to the location and/or coverage area of a femtocell that detected high traffic demand.

In some embodiments, the above metrics may be collected and processed in a distributed fashion at each femtocell. In this case, each femtocell may output an indication of high demand in the area and/or otherwise take action to address (e.g., mitigate, reduce, or improve service (e.g., resources) for) the high demand at an identified traffic congestion zone. This scenario is described in more detail below in conjunction with FIG. 5.

Alternatively, the femtocells may collectively take action to address the high demand at one or more identified traffic congestion zones. This scenario is described in more detail below in conjunction with FIG. 6.

In other embodiments, metrics may be collected from the femtocells at a central entity (e.g., a network entity) and processed to identifying any traffic congestion zones near the femtocells. The central entity may then take action (e.g., control the operation of one or more of the femtocells and/or send an indication) to address the high demand at the traffic congestion zone(s). This scenario is described in more detail below in conjunction with FIG. 4.

Combining the metric information with femtocell location information allows accurate identification of the high demand areas. Femtocell location information may be obtained in a variety of ways. For example, this location information may be directly obtained from the GPS coordinates of the femtocell, obtained from the address of the femtocell owner in the network operator's database, or obtained in some other manner.

As represented by block 306, once traffic congestion zones are identified, various actions may be taken to enhance the existing deployment (e.g., improve service) in the area in an effort to address the demand based on the localization and the amount of demand. For example, one or more of the actions that follow may be invoked in an attempt to, for example, provide additional resources for the high traffic volume in the traffic congestion zone.

In some embodiments, a management system or some other type of central entity enables (e.g., turns on) more femtocells in the area. For example, the system may be configured to strategically deploy femtocells whereby femtocells are only enabled for full service when needed. Here, a non-enabled femtocell may operate in a reduced functionality mode where the wireless transceiver is turned off but the femtocell is still able to receive messages over the backhaul. In this case, a central entity may send a message to the femtocell to enable the femtocell for full service.

In some embodiments, an operating mode of one or more femtocells in an identified high demand area may be changed. For example, a management system or some other type of central entity may change a femtocell from closed access to open access. As a result, the femtocell may provide service to more access terminals in the area.

In some embodiments, a management system or some other type of central entity adjusts femtocell parameters, which results in more femtocells being enabled to serve the high demand area. For example, a central entity may send a message to a femtocell instructing the femtocell to adjust one or more of its parameters. The adjustment of the parameter(s) may then cause the femtocell to, for example, provide coverage over a wider area, more readily accept access terminals (e.g., for hand-in or reselection), and so on.

In some embodiments, a network operator may deploy femtocells with more channel elements upon detection of a high traffic area. For example, the femtocells in a given area may be replaced if the monitoring indicates that there are a large number of active users in the area of the femtocell.

In some embodiments, backhaul resources may be increased upon detection of a high traffic area. For example, if there is high data demand at a given femtocell, the backhaul for that femtocell may be provisioned with a higher limit. Alternatively, a network operator may provide more incentive to a user to increase his/her backhaul capacity.

In some embodiments, a network operator may deploy additional resources upon detection of a high traffic area. For example, additional access points (low-power cells or macrocells) may be deployed in the area. As another example, more radiofrequency (RF) carriers may be deployed in the area (e.g., femtocells may be configured to operate on additional RF carriers).

In some embodiments, a femtocell or a group of femtocells may adjust one or more local parameters upon detection of a high traffic area. For example, to improve user service, handover parameters may be adjusted to optimize offloading of access terminals to femtocells, parameters may be adjusted to increase the coverage of the femtocells, and so on.

As mentioned above, information indicative of traffic demand at low-power access points may be collected at a central entity or in a distributed manner. In addition, the action taken upon detection of a traffic congestion zone may be invoked by a central entity, a single low-power access point, or a set of corroborating low-power access points. Sample operations relating to these different scheme will now be described in more detail in conjunction with the flowcharts of FIGS. 4-6.

Figure 4:
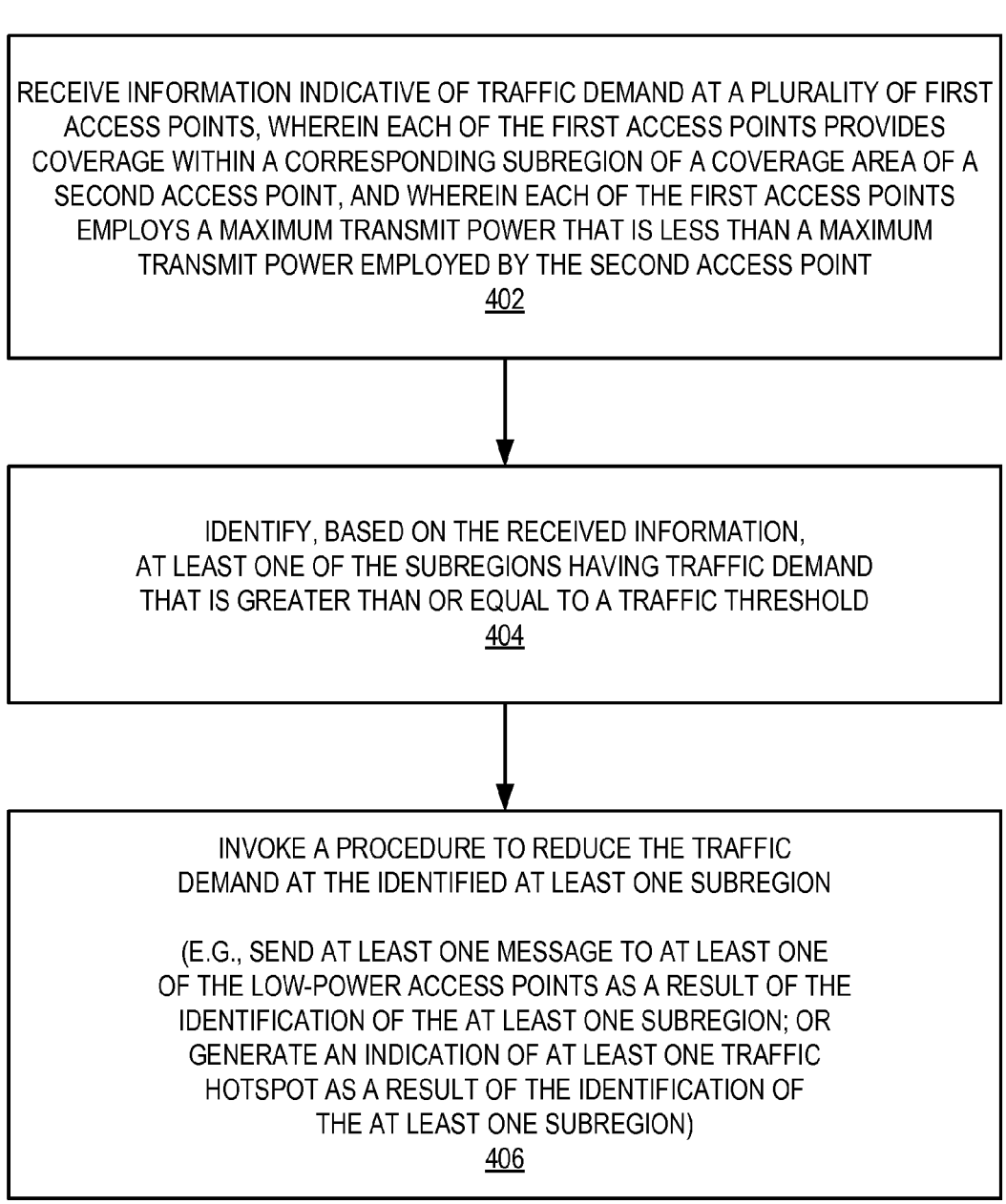
FIG. 4 is a flowchart of several sample aspects of operations that may be performed in conjunction with identifying a subregion having high traffic demand (e.g., a traffic congestion zone) based on traffic demand at a plurality of low-power access points and taking action to address the high traffic demand.

FIG. 4 illustrates sample operations that may be performed, for example, by a central entity (e.g., a network entity). This entity may acquire information from low-power access points, identify any traffic congestion zones based on this information, and take appropriate action to address the high demand at any identified traffic congestion zones.

As represented by block 402, the central entity receives information indicative of traffic demand at a plurality of low-power access points. Each of the low-power access points provides coverage within a corresponding subregion of a coverage area of at least one second access point. These subregions may or may not overlap (e.g., some subregions may be mutually exclusive, while other subregions overlap at least in part).

As discussed herein, each of the low-power access points employs a maximum transmit power that is less than a maximum transmit power employed by the second access point(s). For example, the low-power access points may comprise femtocells and/or picocells, while the second access point comprises a macrocell.

Each of these femtocells may acquire corresponding information indicative of traffic demand and send this information to the central entity. As discussed herein, information indicative of traffic demand (e.g., traffic metrics) may comprise one or more of: a quantity of user registrations, a quantity of calls, total data throughput carried over a low-power access point per unit time, data throughput per user, data throughput per connection, channel element usage statics, or a percentage of time a low-power access point meets or exceeds a resource limitation (e.g., channel elements, backhaul resources, airlink resources).

As represented by block 404, based on the received information, the central entity identifies at least one of the subregions having traffic demand that is greater than or equal to a traffic threshold. That is, the central entity identifies any traffic congestion zones within a designated coverage area (e.g., macrocell coverage area). For example, each of the traffic demand metrics acquired at block 402 may be compared to a corresponding threshold. If a defined percentage (e.g., some or all) of the metrics from a given femtocell (or neighboring femtocells) meet or exceed the corresponding threshold, the central entity may deem that a traffic congestion zone exists at that femtocell or at those femtocells.

As represented by block 406, as a result of the identification of the at least one subregion, a procedure may be invoked to reduce the traffic demand at the identified at least one subregion. For example, the central entity may: 1) send at least one message to at least one of the low-power access points; and/or 2) generate an indication of at least one traffic congestion zone.

Such a message may specify, for example, an action to be taken to address the traffic demand at each of the identified subregions. In some embodiments, the message specifies at least one adjustment of at least one parameter at the at least one low-power access point. Such a parameter may comprise, for example, a power parameter, a handover parameter, a spectrum usage parameter, a communication capabilities parameter, an access point enable/disable parameter, or a backhaul resource parameter.

The central entity may generate the indication described above to cause another entity or a person to take action. For example, the generation of the indication may involve sending a message to a network entity (e.g., femto management server) to cause the network entity to take action. As another example, the generation of the indication may involve sending a message to a user interface (e.g., directly or via a network) to cause a person (e.g., a network planner) to take action. The indication may be generated to invoke one or more of, for example: enablement of at least one low-power access point in a vicinity of the at least one subregion, change in an access mode of at least one access point from closed access to open access, deployment of at least one low-power access point in a vicinity of the at least one subregion, or deployment of at least one additional carrier for at least one of the low-power access points.

Figure 5:
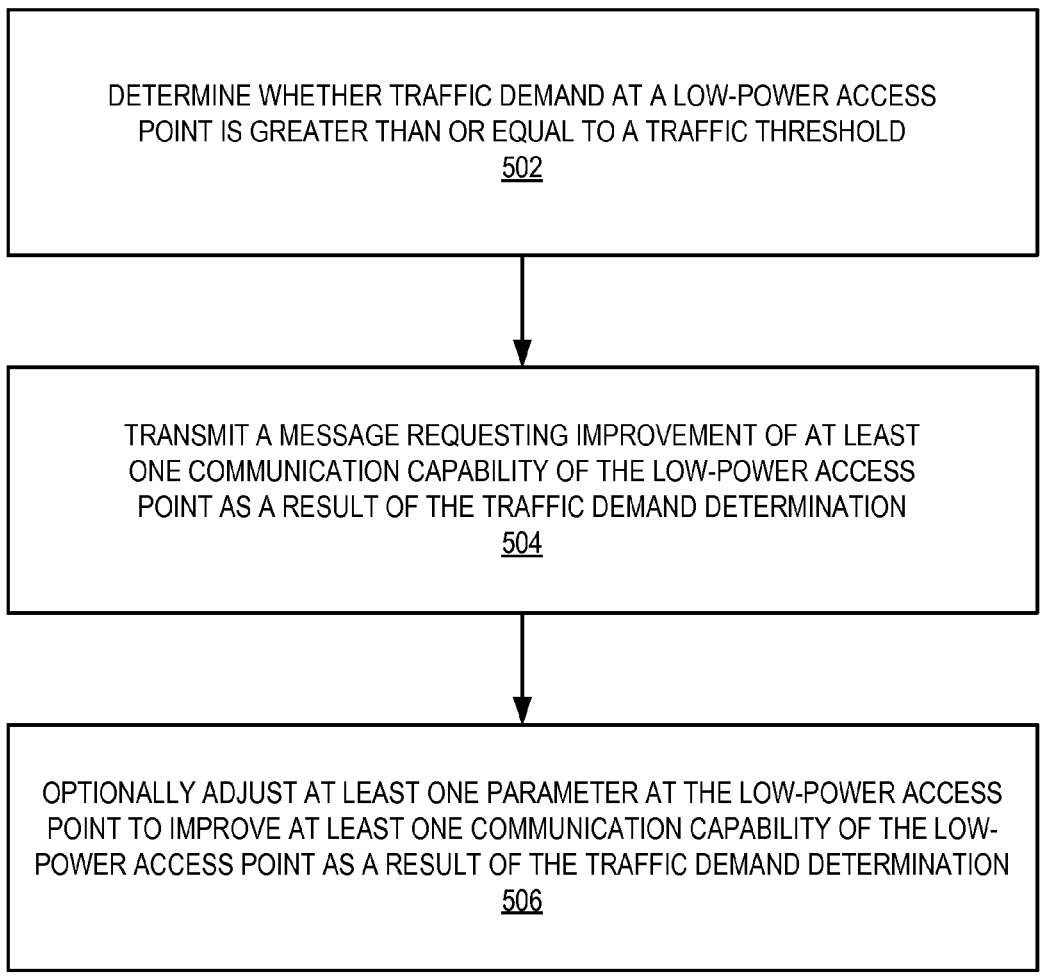
FIG. 5 is a flowchart of several sample aspects of operations that may be performed in conjunction with a low-power access point taking action to improve its communication capability as a result of identifying a subregion having high traffic demand.

FIG. 5 illustrates sample operations that may be performed by a low-power access point that identifies a traffic congestion zone (e.g., at or near the low-power access point) and takes appropriate action to address the high demand at the identified traffic congestion zone.

As represented by block 502, the low-power access point determines whether traffic demand at the low-power access point is greater than or equal to a traffic threshold. If so, a determination may be made that a traffic congestion zone exists at (or near) the low-power access point. Traffic demand may be indicated, for example, by any of the traffic-related metrics discussed above at block 402.

As represented by block 504, the low-power access point transmits a message requesting improvement of at least one communication capability of the low-power access point as a result of the traffic demand determination. For example, the low-power access point may send this message to a central entity (e.g., a network node), to one or more neighboring low-power access points, to some other entity, or to some combination of the above.

The message sent by the low-power access point may take various forms. In some embodiments, the message comprises a request for improved backhaul bandwidth at the low-power access point. In some embodiments, the message comprises a request to perform resource partitioning with at least one other low-power access point. In some embodiments, the message comprises a request to replace the low-power access point with a another low-power access point (e.g., that has more channel elements than the low-power access point).

As represented by block 506, the low-power access point optionally adjusts at least one communication capability of the low-power access point as a result of the traffic demand determination. For example, the low-power access point may provide additional resources and/or alter how it handles handovers in an attempt to improve at least one communication capability of the low power access point and, thereby, mitigate the high traffic demand.

In some embodiments, the adjustment of the at least one communication capability comprises adjusting at least one parameter at the low-power access point. Such a parameter may comprise, for example, a power parameter, a handover parameter, a spectrum usage parameter, or a backhaul resource parameter.

Figure 6:
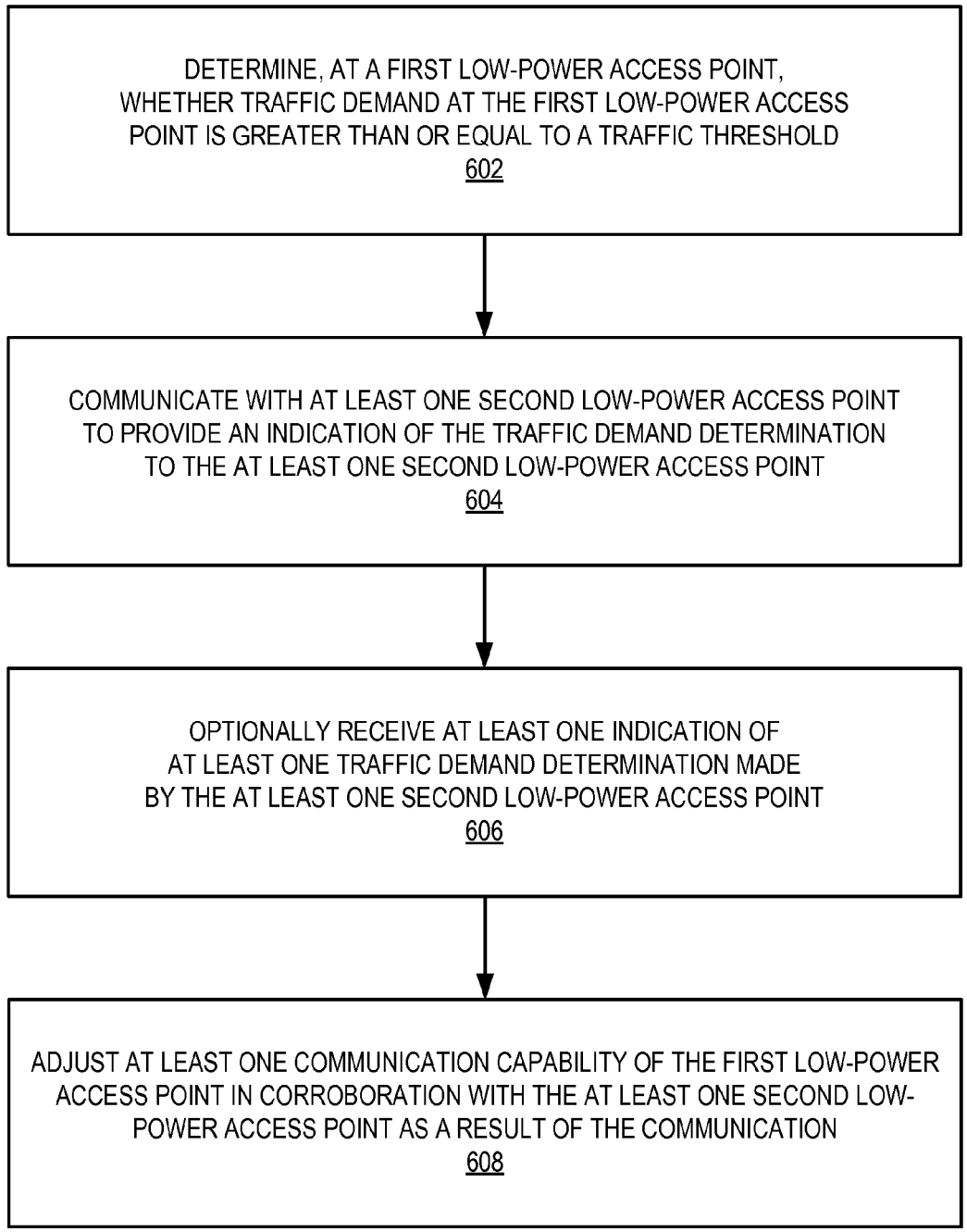
FIG. 6 is a flowchart of several sample aspects of operations that may be performed to adjust the communication capability of a low-power access point in corroboration with at least one other low-power access point as a result of identifying a subregion having high traffic demand.

FIG. 6 illustrates sample operations may be performed by each of a set of low-power access points, where each of the low-power access points determines whether there is a nearby traffic congestion zone (e.g., at the low-power access point), and where the low-power access points collectively take action to mitigate the high demand at the identified traffic congestion zone(s). In some embodiments, the low-power access points of the set are members of a common (i.e., the same) low-power access point cluster (e.g., a set of Home NodeBs that are under the same Home NodeB Gateway). The operations of block 602 for a given low-power access point may be similar to the operations of block 502.

As represented by block 604, the low-power access point communicates with at least one other low-power access point of the set to provide an indication of the traffic demand determination (from block 602) to the at least one other low-power access point. For example, the low-power access point may send a message indicating whether a traffic congestion zone has been identified and optionally including the acquired traffic metrics.

As represented by block 606, in some cases, the low-power access point will receive at least one indication of at least one traffic demand determination made by the at least one other low-power access point. For example, the low-power access point may receive messages that indicate whether other traffic congestion zones have been identified, along with any associated traffic metrics. Thus, in this way, each of the low-power access points of the set may obtain information about all of the traffic congestion zones in the coverage area.

As represented by block 608, as a result of the communication of block 604 (and, optionally, based on an indication received at block 606), the low-power access point adjusts at least one communication capability of the low-power access point in corroboration with the at least one other low-power access point. Advantageously, neighboring low-power access points may be able to cooperate to improve conditions in or near a local traffic congestion zone or multiple local traffic congestion zones. Consequently, network resources may be deployed more efficiently since each low-power access point need not attempt to solve its respective traffic congestion zone issues on its own.

As discussed above, the adjustment of the at least one communication capability may involve adjusting at least one parameter at the low-power access point. Again, such a parameter may comprise, for example, a power parameter, a handover parameter, a spectrum usage parameter, or a backhaul resource parameter.

FIG. 7 illustrates several sample components (represented by corresponding blocks) that may be incorporated into an apparatus 702 or an apparatus 704 (e.g., corresponding to the access point 106 or the network entity 110 of FIG. 1, respectively) to perform traffic congestion control operations as taught herein. It should be appreciated that these components may be implemented in different types of apparatuses in different implementations (e.g., in an ASIC, in a system on a chip (SoC), etc.). The described components also may be incorporated into other nodes in a communication system. For example, other nodes in a system may include components similar to those described for the apparatuses 702 and 704 to provide similar functionality. Also, a given node may contain one or more of the described components. For example, an apparatus may include multiple transceiver components that enable the apparatus to operate on multiple carriers and/or communicate via different technologies.

The apparatus 702 includes at least one communication component 706 (e.g., at least one wireless transceiver device) for communicating with other nodes via at least one designated radio access technology. The communication component 706 includes at least one transmitter 712 for transmitting signals (e.g., messages, indications, information, and so on) and at least one receiver 714 for receiving signals (e.g., messages, indications, information, and so on). In some embodiments, a communication component (e.g., one of multiple wireless communication devices) of the apparatus 702 comprises a network listen module.

The apparatus 702 and the apparatus 704 each include one or more communication components 708 and 710 (e.g., one or more network interface devices), respectively, for communicating with other nodes (e.g., other network entities). For example, the communication components 708 and 710 may be configured to communicate with one or more network entities via a wire-based or wireless backhaul or backbone. In some aspects, each of the communication components 708 and 710 may be implemented as a transceiver configured to support wire-based or wireless communication. This communication may involve, for example, sending and receiving: messages, parameters, other types of information, and so on. Accordingly, in the example of FIG. 7, the communication component 708 is shown as comprising a transmitter 716 for sending signals and a receiver 718 for receiving signals. Similarly, the communication component 710 is shown as comprising a transmitter 720 for sending signals and a receiver 722 for receiving signals.

The apparatuses 702 and 704 also include other components that may be used in conjunction with communication management-related operations as taught herein. For example, the apparatus 702 includes a processing system 724 for providing functionality relating to traffic congestion control (e.g., identifying subregion(s) having traffic demand that is greater than or equal to a traffic threshold; invoking a procedure to reduce the traffic demand; determining whether traffic demand at a low-power access point is greater than or equal to a traffic threshold; adjusting at least one parameter at a low-power access point; adjusting at least one communication capability of the first low-power access point in corroboration with the at least one second low-power access point) in accordance with the teachings herein and for providing other processing functionality. Similarly, the apparatus 704 includes a processing system 726 for providing functionality relating to traffic congestion control in accordance with the teachings herein (e.g., as discussed above) and for providing other processing functionality. Each of the apparatuses 702 or 704 includes a respective memory component 728 or 730 (e.g., each including a memory device) for maintaining information (e.g., information, thresholds, parameters, and so on). In addition, each apparatus 702 or 704 includes a user interface device 732 or 734 for providing indications (e.g., audible and/or visual indications) to a user and/or for receiving user input (e.g., upon user actuation of a sensing device such a keypad, a touch screen, a microphone, and so on).

For convenience, the apparatuses 702 and 704 are shown in FIG. 7 as including components that may be used in the various examples described herein. In practice, the illustrated blocks may have different functionality in different implementations. For example, in some implementations, the functionality of the block 724 or 726 may be different for supporting the scheme of FIG. 5 as compared to the functionality for supporting the scheme of FIG. 6.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 706, 708, 724, 728, and 732 may be implemented by processor and memory component(s) of the apparatus 702 (e.g., by execution of appropriate code and/or by appropriate configuration of processor components). Similarly, some or all of the functionality represented by blocks 710, 726, 730, and 734 may be implemented by processor and memory component(s) of the apparatus 704 (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femtocell, and so on. In some implementations, a node may be associated with (e.g., referred to as or divided into) one or more cells or sectors. A cell or sector associated with a macro access point, a femto access point, or a pico access point may be referred to as a macro cell, a femtocell, or a pico cell, respectively.

Figure 8:
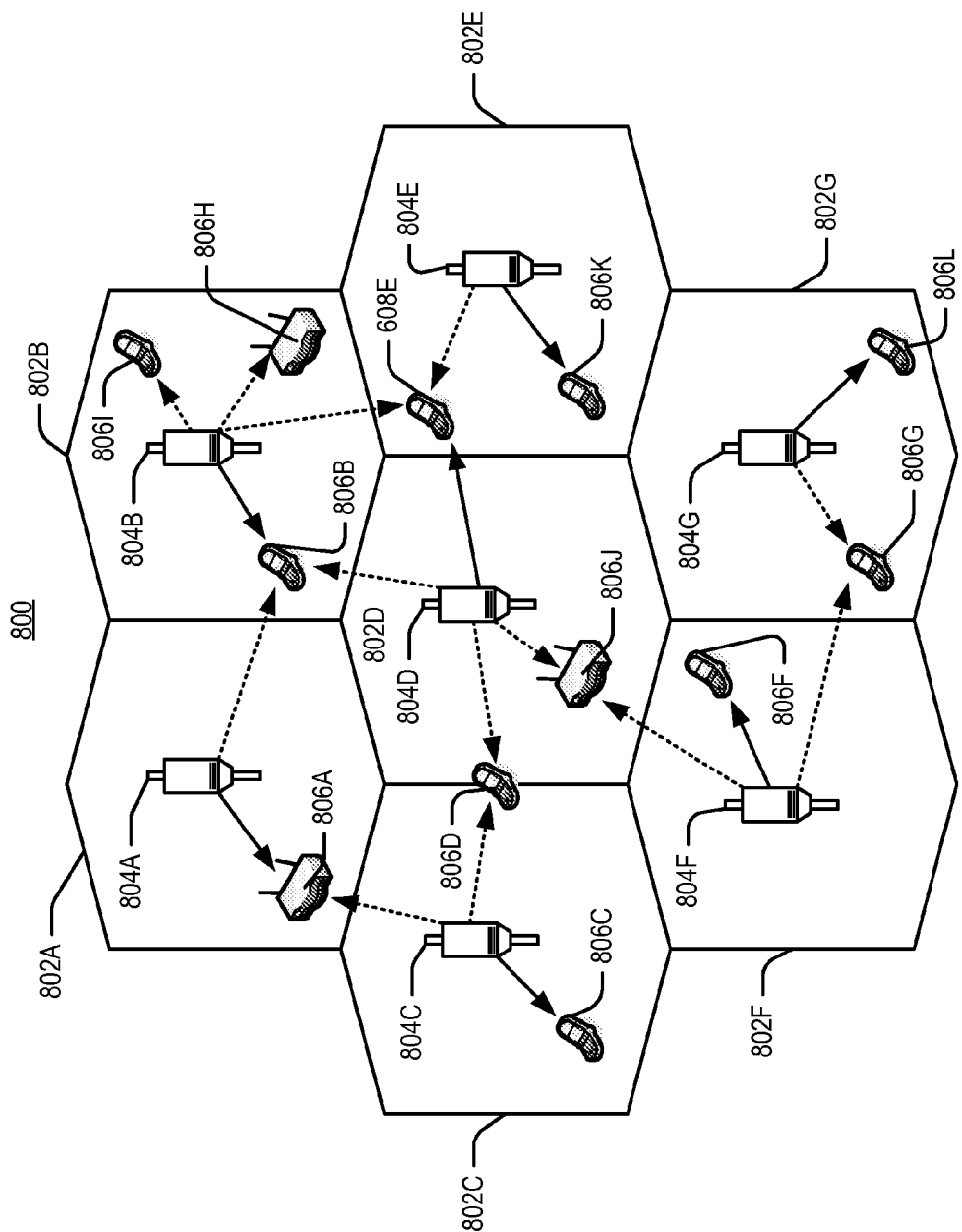
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handover, for example. The wireless communication system 800 may provide service over a large geographic region. For example, macro cells 802A-802G may cover a few blocks in a neighborhood or several miles in a rural environment.

Figure 9:
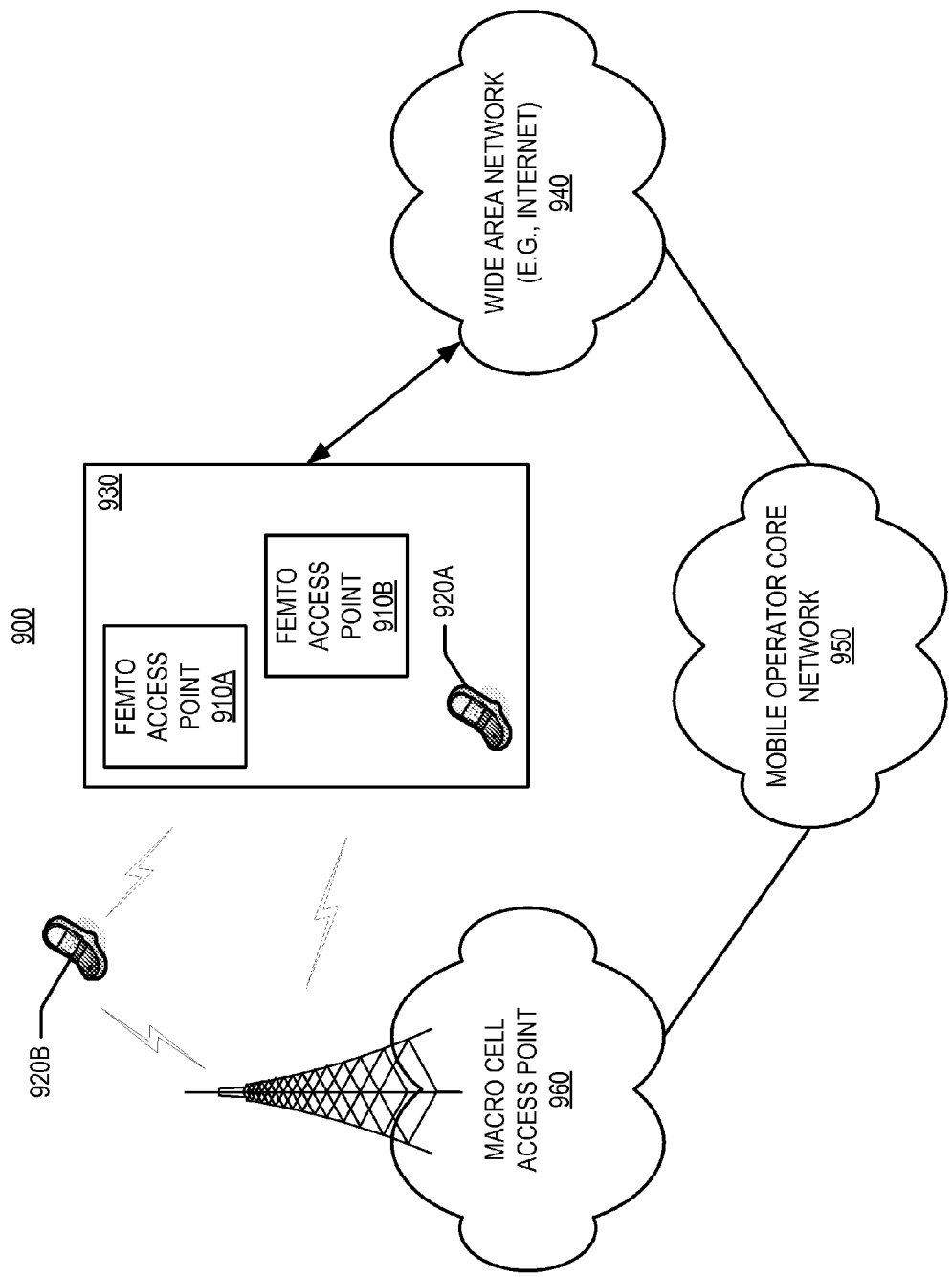
FIG. 9 is a simplified diagram of a wireless communication system including femto nodes.

FIG. 9 illustrates an exemplary communication system 900 where one or more femto access points are deployed within a network environment. Specifically, the system 900 includes multiple femto access points 910 (e.g., femto access points 910A and 910B) installed in a relatively small-scale network environment (e.g., in one or more user residences 930). Each femto access point 910 may be coupled to a wide area network 940 (e.g., the Internet) and a mobile operator core network 950 via a DSL router, a cable modem, a wireless link, or other connectivity means (not shown). As will be discussed below, each femto access point 910 may be configured to serve associated access terminals 920 (e.g., access terminal 920A) and, optionally, other (e.g., hybrid or alien) access terminals 920 (e.g., access terminal 920B). In other words, access to femto access points 910 may be restricted whereby a given access terminal 920 may be served by a set of designated (e.g., home) femto access point(s) 910 but may not be served by any non-designated femto access points 910 (e.g., a neighbor's femto access point 910).

Figure 10:
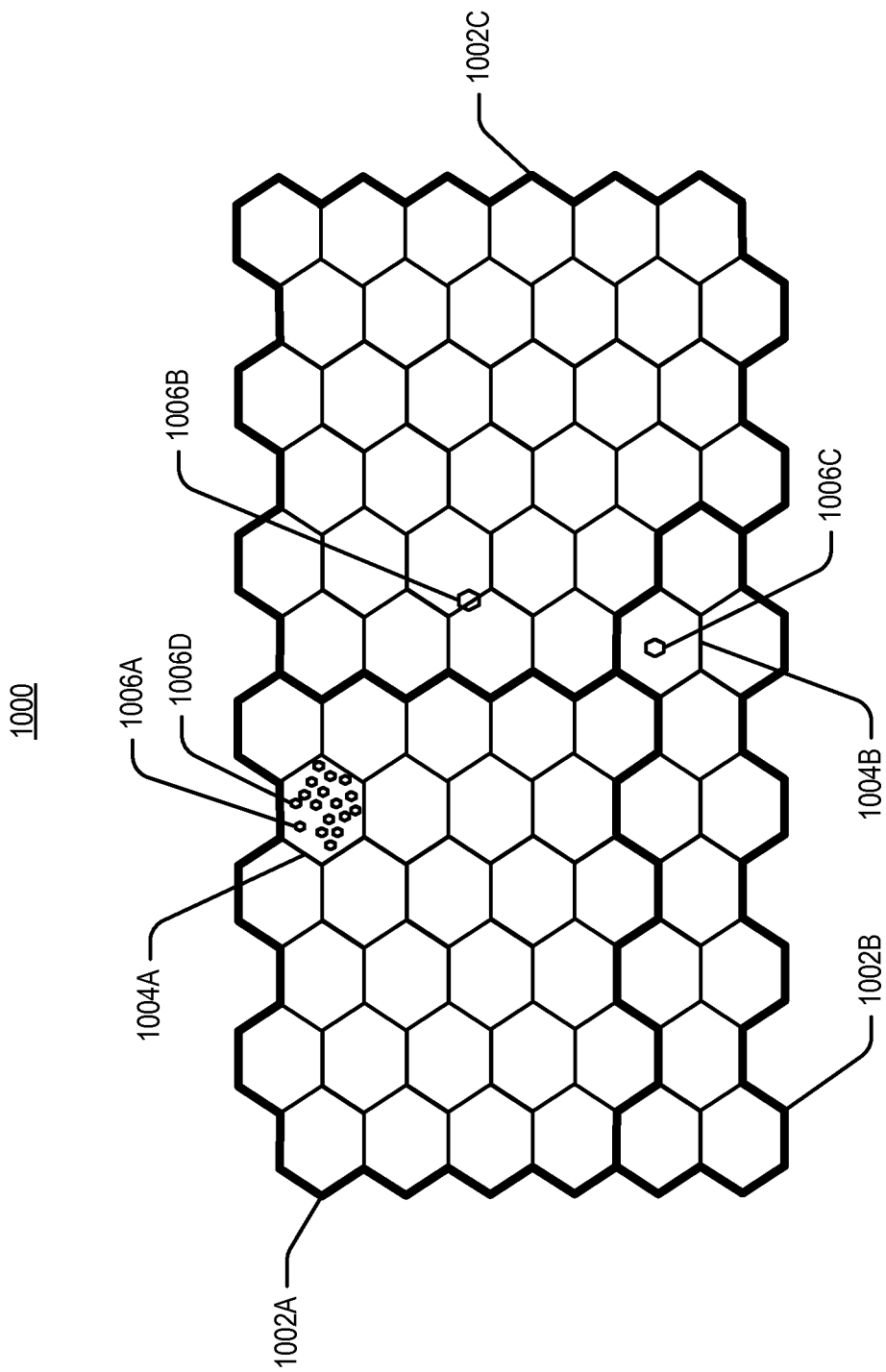
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 might not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a femto access point 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of femto access points 910 (e.g., the femto access points 910A and 910B that reside within a corresponding user residence 930). For example, when a subscriber is outside his home, he is served by a standard macro access point (e.g., access point 960) and when the subscriber is at home, he is served by a femto access point (e.g., access point 910A). Here, a femto access point 910 may be backward compatible with legacy access terminals 920.

A femto access point 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred femto access point (e.g., the home femto access point of the access terminal 920) whenever such connectivity is possible. For example, whenever the access terminal 920A is within the user's residence 930, it may be desired that the access terminal 920A communicate only with the home femto access point 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred femto access point 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 910, the access terminal 920 selects the femto access point 910 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 910 that reside within the corresponding user residence 930). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
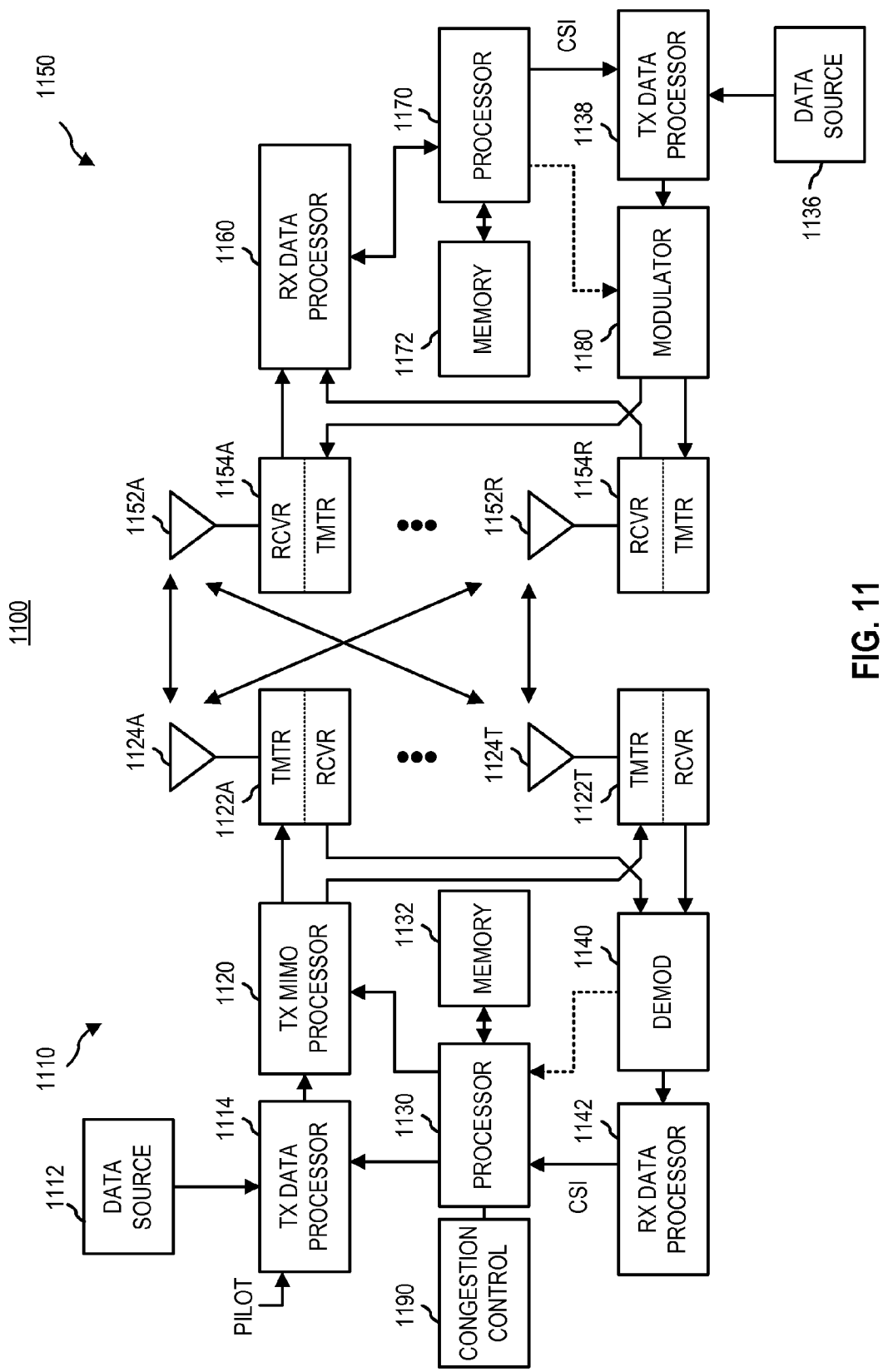
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform traffic congestion control operations as taught herein. For example, a congestion control component 1190 may cooperate with the processor 1130 and/or other components of the device 1110 to monitor signals from another device (e.g., device 1150) as taught herein. It should be appreciated that for each device 1110 and 1150 the functionality of two or more of the described components may be provided by a single component. For example, a single processing component may provide the functionality of the congestion control component 1190 and the processor 1130.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femtocell, a femto node, a pico node, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 12:
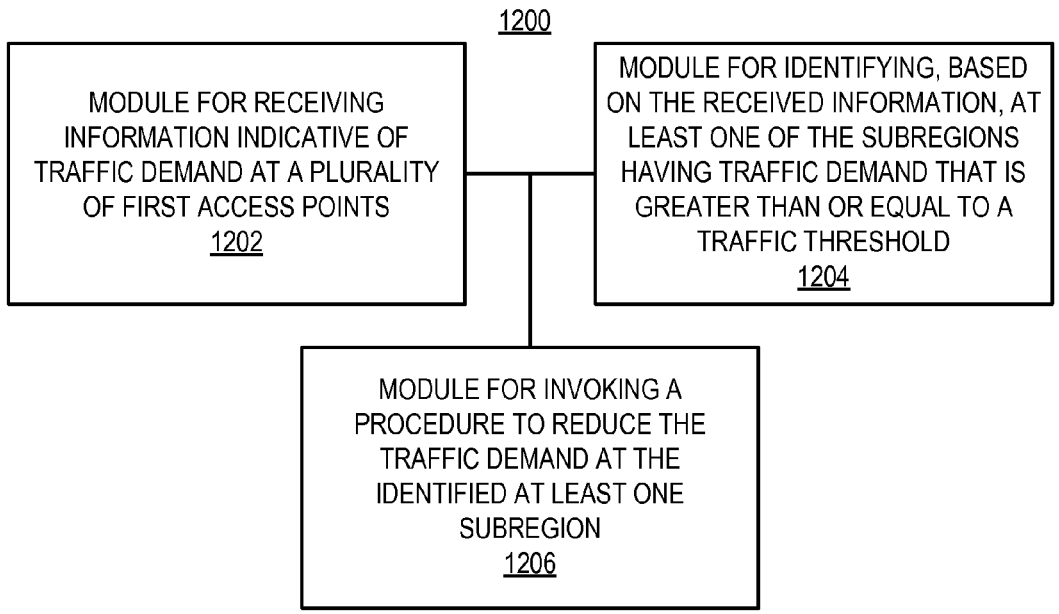
FIGS. 12-14 are simplified block diagrams of several sample aspects of apparatuses configured to identify and address traffic congestion zones as taught herein.

Referring to FIG. 12, an apparatus 1200 is represented as a series of interrelated functional modules. A module for (e.g., means for) receiving information indicative of traffic demand at a plurality of first access points 1202 may correspond at least in some aspects to, for example, a communication component as discussed herein. A module for (e.g., means for) identifying, based on the received information, at least one of the subregions having traffic demand that is greater than or equal to a traffic threshold 1204 may correspond at least in some aspects to, for example, a processing system as discussed herein. A module for (e.g., means for) invoking a procedure to reduce the traffic demand at the identified at least one subregion 1206 may correspond at least in some aspects to, for example, a processing system as discussed herein.

Figure 13:
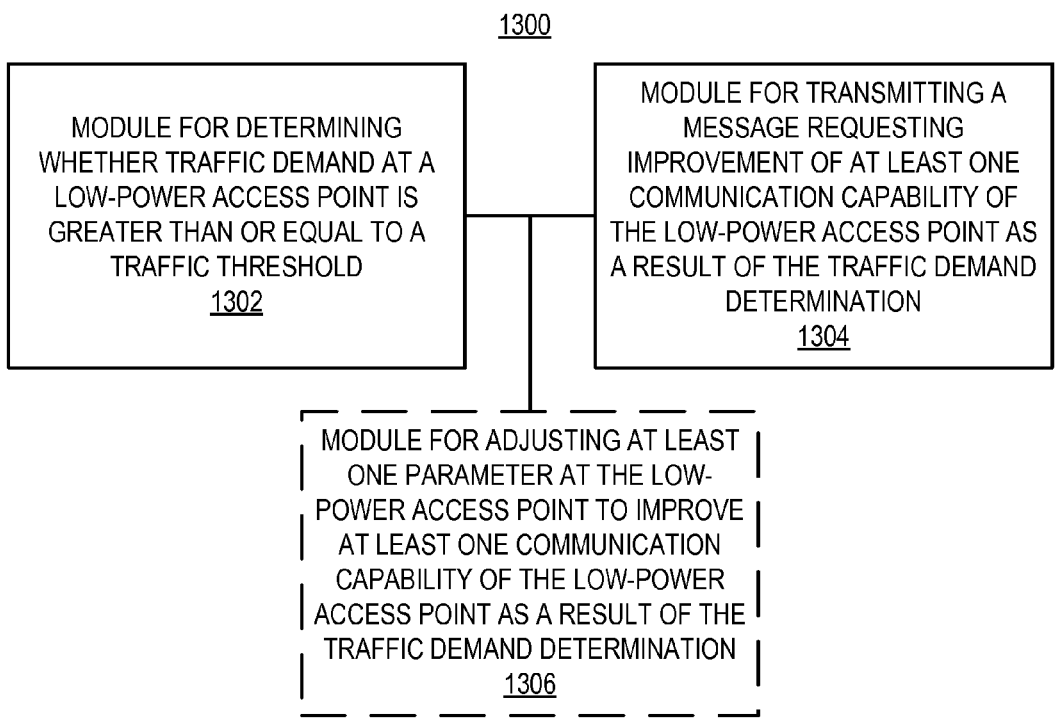

Referring to FIG. 13, an apparatus 1300 is represented as a series of interrelated functional modules. A module for (e.g., means for) determining whether traffic demand at a low-power access point is greater than or equal to a traffic threshold 1302 may correspond at least in some aspects to, for example, a processing system as discussed herein. A module for (e.g., means for) transmitting a message requesting improvement of at least one communication capability of the low-power access point as a result of the traffic demand determination 1304 may correspond at least in some aspects to, for example, a communication component as discussed herein. A module for (e.g., means for) adjusting at least one parameter at the low-power access point to improve at least one communication capability of the low-power access point as a result of the traffic demand determination 1306 may correspond at least in some aspects to, for example, a processing system as discussed herein.

Figure 14:
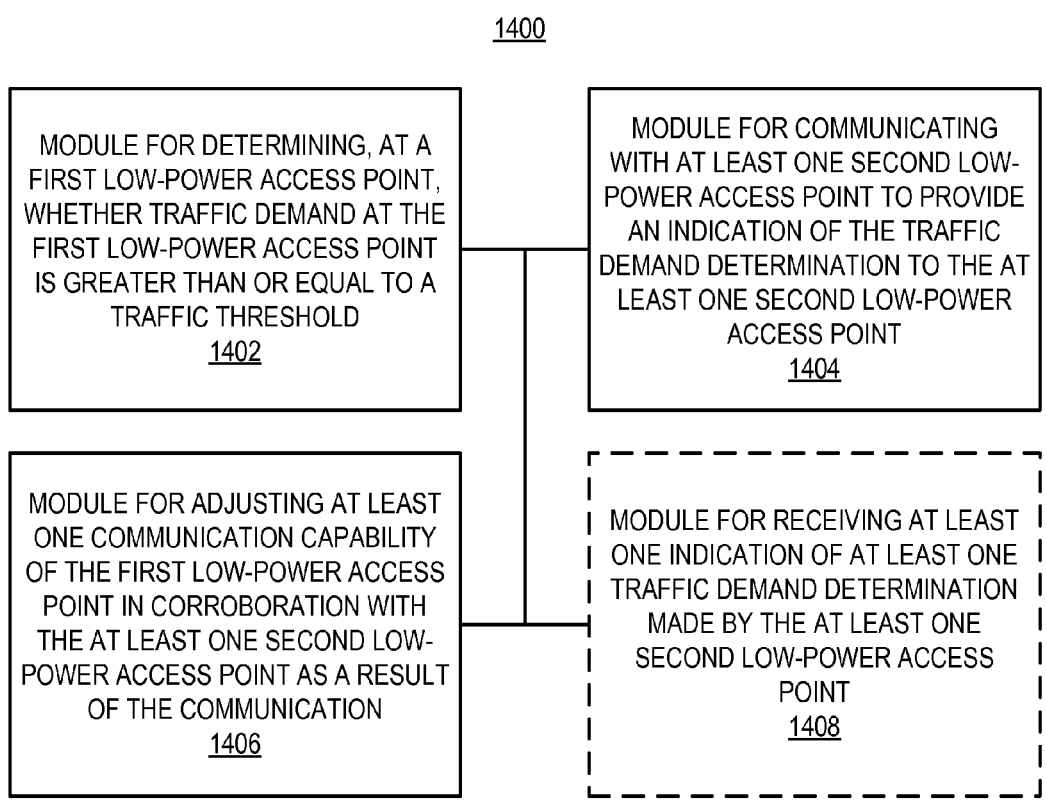

Referring to FIG. 14, an apparatus 1400 is represented as a series of interrelated functional modules. A module for (e.g., means for) determining, at a first low-power access point, whether traffic demand at the first low-power access point is greater than or equal to a traffic threshold 1402 may correspond at least in some aspects to, for example, a processing system as discussed herein. A module for (e.g., means for) communicating with at least one second low-power access point to provide an indication of the traffic demand determination to the at least one second low-power access point 1404 may correspond at least in some aspects to, for example, a communication component as discussed herein. A module for (e.g., means for) adjusting at least one communication capability of the first low-power access point in corroboration with the at least one second low-power access point as a result of the communication 1406 may correspond at least in some aspects to, for example, a processing system as discussed herein. A module for (e.g., means for) receiving at least one indication of at least one traffic demand determination made by the at least one second low-power access point 1408 may correspond at least in some aspects to, for example, a communication component as discussed herein.

The functionality of the modules of FIGS. 12-14 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. The functionality of these modules also may be implemented in some other manner as taught herein. In some aspects one or more of any dashed blocks in FIGS. 12-14 are optional.

In addition, the components and functions represented by FIGS. 12-14 as well as other components and functions described herein, may be implemented using any suitable means. Such means also may be implemented, at least in part, using corresponding structure as taught herein. For example, the components described above in conjunction with the "module for" components of FIGS. 12-14 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage media, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
 a communication component configured to receive information indicative of traffic demand at a plurality of first access points, wherein each of the first access points provides coverage within a corresponding subregion of a coverage area of a second access point, and wherein each of the first access points employs a maximum transmit power that is less than a maximum transmit power employed by the second access point; and
 a processing system configured to identify, based on the received information, at least one of the subregions having traffic demand that is greater than or equal to a traffic threshold, and further configured to invoke a procedure to reduce the traffic demand at the identified at least one subregion.

2. The apparatus of claim 1, wherein:
 the procedure comprises sending at least one message to at least one of the first access points as a result of the identification of the at least one subregion; and
 the at least one message specifies an action to be taken to address the traffic demand at each identified subregion.

3. The apparatus of claim 2, wherein the action to be taken comprises at least one adjustment of at least one parameter at the at least one first access point.

4. The apparatus of claim 3, wherein the at least one parameter comprises at least one of: a power parameter, a handover parameter, a spectrum usage parameter, a communication capabilities parameter, an access point enable/disable parameter, and a backhaul resource parameter.

5. The apparatus of claim 1, wherein:
 the procedure comprises generating an indication of at least one traffic congestion zone as a result of the identification of the at least one subregion; and
 the indication is generated to invoke at least one of: enablement of at least one access point in a vicinity of the at least one subregion, change in an access mode of at least one access point from closed access to open access, deployment of at least one access point in a vicinity of the at least one subregion, or deployment of at least one additional carrier for at least one of the first access points.

6. The apparatus of claim 1, wherein the information indicative of traffic demand comprises at least one of: a quantity of user registrations, a quantity of calls, total data throughput carried over an access point per unit time, data throughput per user, data throughput per connection, channel element usage statics, or a percentage of time an access point meets or exceeds a resource limitation.

7. The apparatus of claim 1, wherein each of the first access points has a transmit power that is less than a transmit power of the second access point by 10 dBm or more.

8. The apparatus of claim 1, wherein the first access points comprise femtocells and/or picocells.

9. A method of communication, comprising:
 receiving information indicative of traffic demand at a plurality of first access points, wherein each of the first access points provides coverage within a corresponding subregion of a coverage area of a second access point, and wherein each of the first access points employs a maximum transmit power that is less than a maximum transmit power employed by the second access point;
 identifying, based on the received information, at least one of the subregions having traffic demand that is greater than or equal to a traffic threshold; and
 invoking a procedure to reduce the traffic demand at the identified at least one subregion.

10. The method of claim 9, wherein:
 the procedure comprises sending at least one message to at least one of the first access points as a result of the identification of the at least one subregion; and
 the at least one message specifies an action to be taken to address the traffic demand at each identified subregion.

11. The method of claim 10, wherein the action to be taken comprises at least one adjustment of at least one parameter at the at least one first access point.

12. The method of claim 11, wherein the at least one parameter comprises at least one of: a power parameter, a handover parameter, a spectrum usage parameter, a communication capabilities parameter, an access point enable/disable parameter, and a backhaul resource parameter.

13. The method of claim 9, wherein:
the procedure comprises generating an indication of at least one traffic congestion zone as a result of the identification of the at least one subregion; and
the indication is generated to invoke at least one of: enablement of at least one access point in a vicinity of the at least one subregion, change in an access mode of at least one access point from closed access to open access, deployment of at least one access point in a vicinity of the at least one subregion, or deployment of at least one additional carrier for at least one of the first access points.

14. The method of claim 9, wherein the information indicative of traffic demand comprises at least one of: a quantity of user registrations, a quantity of calls, total data throughput carried over an access point per unit time, data throughput per user, data throughput per connection, channel element usage statics, or a percentage of time an access point meets or exceeds a resource limitation.

15. The method of claim 9, wherein each of the first access points has a transmit power that is less than a transmit power of the second access point by 10 dBm or more.

16. The method of claim 9, wherein the first access points comprise femtocells and/or picocells.

17. An apparatus for communication, comprising:
means for receiving information indicative of traffic demand at a plurality of first access points, wherein each of the first access points provides coverage within a corresponding subregion of a coverage area of a second access point, and wherein each of the first access points employs a maximum transmit power that is less than a maximum transmit power employed by the second access point;
means for identifying, based on the received information, at least one of the subregions having traffic demand that is greater than or equal to a traffic threshold; and
means for invoking a procedure to reduce the traffic demand at the identified at least one subregion.

18. The apparatus of claim 17, wherein:
the procedure comprises sending at least one message to at least one of the first access points as a result of the identification of the at least one subregion; and
the at least one message specifies an action to be taken to address the traffic demand at each identified subregion.

19. The apparatus of claim 18, wherein:
the action to be taken comprises at least one adjustment of at least one parameter at the at least one first access point; and
the at least one parameter comprises at least one of: a power parameter, a handover parameter, a spectrum usage parameter, a communication capabilities parameter, an access point enable/disable parameter, and a backhaul resource parameter.

20. The apparatus of claim 17, wherein:
the procedure comprises generating an indication of at least one traffic congestion zone as a result of the identification of the at least one subregion; and
the indication is generated to invoke at least one of: enablement of at least one access point in a vicinity of the at least one subregion, change in an access mode of at least one access point from closed access to open access, deployment of at least one access point in a vicinity of the at least one subregion, or deployment of at least one additional carrier for at least one of the first access points.

21. The apparatus of claim 17, wherein the information indicative of traffic demand comprises at least one of: a quantity of user registrations, a quantity of calls, total data throughput carried over an access point per unit time, data throughput per user, data throughput per connection, channel element usage statics, or a percentage of time an access point meets or exceeds a resource limitation.

22. A non-transitory computer-readable storage medium storing instructions that, when executed by a processor, cause the processor to perform operations comprising:
computer-readable medium comprising code for causing a computer to:
receive information indicative of traffic demand at a plurality of first access points, wherein each of the first access points provides coverage within a corresponding subregion of a coverage area of a second access point, and wherein each of the first access points employs a maximum transmit power that is less than a maximum transmit power employed by the second access point;
identify, based on the received information, at least one of the subregions having traffic demand that is greater than or equal to a traffic threshold; and
invoke a procedure to reduce the traffic demand at the identified at least one subregion.

23. The non-transitory computer-readable storage medium of claim 22, wherein:
the procedure comprises sending at least one message to at least one of the first access points as a result of the identification of the at least one subregion; and
the at least one message specifies an action to be taken to address the traffic demand at each identified subregion.

24. The non-transitory computer-readable storage medium of claim 23, wherein:
the action to be taken comprises at least one adjustment of at least one parameter at the at least one first access point; and
the at least one parameter comprises at least one of: a power parameter, a handover parameter, a spectrum usage parameter, a communication capabilities parameter, an access point enable/disable parameter, and a backhaul resource parameter.

25. The non-transitory computer-readable storage medium of claim 22, wherein:
the procedure comprises generating an indication of at least one traffic congestion zone as a result of the identification of the at least one subregion; and
the indication is generated to invoke at least one of: enablement of at least one access point in a vicinity of the at least one subregion, change in an access mode of at least one access point from closed access to open access, deployment of at least one access point in a vicinity of the at least one subregion, or deployment of at least one additional carrier for at least one of the first access points.

26. The non-transitory computer-readable storage medium of claim 22, wherein the information indicative of traffic demand comprises at least one of: a quantity of user registrations, a quantity of calls, total data throughput carried over an access point per unit time, data throughput per user, data throughput per connection, channel element usage statics, or a percentage of time an access point meets or exceeds a resource limitation.

27. An apparatus for communication, comprising:
a processing system configured to determine whether traffic demand at a low-power access point is greater than or equal to a traffic threshold; and a communication component configured to send a message requesting improvement of at least one communication capability of the low-power access point as a result of the traffic demand determination, wherein the message comprises a request to replace the low-power access point with a second low-power access point that has more channel elements than the low-power access point.

28. The apparatus of claim 27, wherein the message comprises a request for improved backhaul bandwidth at the low-power access point.

29. The apparatus of claim 27, wherein the message comprises a request to perform resource partitioning with at least one other low-power access point.

30. The apparatus of claim 27, wherein the traffic demand is indicated by at least one of: a quantity of user registrations, a quantity of calls, total data throughput carried over the low-power access point per unit time, data throughput per user, data throughput per connection, channel element usage statics, or a percentage of time the low-power access point meets or exceeds a resource limitation.

31. The apparatus of claim 27, the processing system is further configured to adjust at least one parameter at the low-power access point to improve at least one communication capability of the low-power access point as a result of the traffic demand determination.

32. The apparatus of claim 31, wherein the at least one parameter comprises at least one of: a power parameter, a handover parameter, a spectrum usage parameter, and a backhaul resource parameter.

33. The apparatus of claim 27, wherein the low-power access point has a maximum transmit power that is less than a maximum transmit power of any macro access point in a defined coverage area.

34. The apparatus of claim 27, wherein the low-power access point comprises a femtocell or a picocell.

35. A method of communication, comprising:
determining whether traffic demand at a low-power access point is greater than or equal to a traffic threshold; and
transmitting a message requesting improvement of at least one communication capability of the low-power access point as a result of the traffic demand determination, wherein the message comprises a request to replace the low-power access point with a second low-power access point that has more channel elements than the low-power access point.

36. The method of claim 35, wherein the message comprises a request for improved backhaul bandwidth at the low-power access point.

37. The method of claim 35, wherein the message comprises a request to perform resource partitioning with at least one other low-power access point.

38. The method of claim 35, wherein the traffic demand is indicated by at least one of: a quantity of user registrations, a quantity of calls, total data throughput carried over the low-power access point per unit time, data throughput per user, data throughput per connection, channel element usage statics, or a percentage of time the low-power access point meets or exceeds a resource limitation.

39. The method of claim 35, further comprising adjusting at least one parameter at the low-power access point to improve at least one communication capability of the low-power access point as a result of the traffic demand determination.

40. The method of claim 39, wherein the at least one parameter comprises at least one of: a power parameter, a handover parameter, a spectrum usage parameter, and a backhaul resource parameter.

41. The method of claim 35, wherein the low-power access point has a maximum transmit power that is less than a maximum transmit power of any macro access point in a defined coverage area.

42. The method of claim 35, wherein the low-power access point comprises a femtocell or a picocell.

43. An apparatus for communication, comprising:
means for determining whether traffic demand at a low-power access point is greater than or equal to a traffic threshold; and
means for transmitting a message requesting improvement of at least one communication capability of the low-power access point as a result of the traffic demand determination, wherein the message comprises a request to replace the low-power access point with a second low-power access point that has more channel elements than the low-power access point.

44. The apparatus of claim 43, wherein the message comprises a request for improved backhaul bandwidth at the low-power access point.

45. The apparatus of claim 43, wherein the message comprises a request to perform resource partitioning with at least one other low-power access point.

46. The apparatus of claim 43, wherein the traffic demand is indicated by at least one of: a quantity of user registrations, a quantity of calls, total data throughput carried over the low-power access point per unit time, data throughput per user, data throughput per connection, channel element usage statics, or a percentage of time the low-power access point meets or exceeds a resource limitation.

47. A non-transitory computer-readable storage medium storing instructions that, when executed by a processor, cause the processor to perform operations comprising:
computer-readable medium comprising code for causing a computer to:
determine whether traffic demand at a low-power access point is greater than or equal to a traffic threshold; and
transmit a message requesting improvement of at least one communication capability of the low-power access point as a result of the traffic demand determination, wherein the message comprises a request to replace the low-power access point with a second low-power access point that has more channel elements than the low-power access point.

48. The non-transitory computer-readable storage medium of claim 47, wherein the message comprises a request for improved backhaul bandwidth at the low-power access point.

49. The non-transitory computer-readable storage medium of claim 47, wherein the message comprises a request to perform resource partitioning with at least one other low-power access point.

50. The non-transitory computer-readable storage medium of claim 47, wherein the traffic demand is indicated by at least one of: a quantity of user registrations, a quantity of calls, total data throughput carried over the low-power access point per unit time, data throughput per user, data throughput per connection, channel element usage statics, or a percentage of time the low-power access point meets or exceeds a resource limitation.

51. An apparatus for communication, comprising:
a processing system configured to determine whether traffic demand at a first low-power access point is greater than or equal to a traffic threshold; and
a communication component configured to communicate with at least one second low-power access point to provide, to the at least one second low-power access point, an indication of whether the traffic demand at the first low-power access point is greater than or equal to the traffic threshold;

wherein the processing system is further configured to adjust at least one communication capability of the first low-power access point in corroboration with the at least one second low-power access point as a result of the communication.

52. The apparatus of claim 51, wherein:

the communication component is further configured to receive at least one indication of at least one traffic demand determination made by the at least one second low-power access point; and the adjustment of the at least one communication capability of the first low-power access point is further based on the received at least one indication.

53. The apparatus of claim 51, wherein the low-power access points are members of a common low-power access point cluster.

54. The apparatus of claim 51, wherein the adjustment of the at least one communication capability comprises adjusting at least one parameter at the first low-power access point.

55. The apparatus of claim 54, wherein the at least one parameter comprises at least one of: a power parameter, a handover parameter, a spectrum usage parameter, and a backhaul resource parameter.

56. The apparatus of claim 51, wherein the traffic demand is indicated by at least one of: a quantity of user registrations, a quantity of calls, total data throughput carried over the first low-power access point per unit time, data throughput per user, data throughput per connection, channel element usage statics, or a percentage of time the first low-power access point meets or exceeds a resource limitation.

57. The apparatus of claim 51, wherein each of the low-power access points has a maximum transmit power that is less than a maximum transmit power of any macro access point in a defined coverage area.

58. The apparatus of claim 51, wherein the low-power access points comprise femtocells and/or picocells.

59. A method of communication, comprising:

determining, at a first low-power access point, whether traffic demand at the first low-power access point is greater than or equal to a traffic threshold;

communicating with at least one second low-power access point to provide, to the at least one second low-power access point, an indication of whether the traffic demand at the first low-power access point is greater than or equal to the traffic threshold; and adjusting at least one communication capability of the first low-power access point in corroboration with the at least one second low-power access point as a result of the communication.

60. The method of claim 59, further comprising receiving at least one indication of at least one traffic demand determination made by the at least one second low-power access point, wherein the adjustment of the at least one communication capability of the first low-power access point is further based on the received at least one indication.

61. The method of claim 59, wherein the low-power access points are members of a common low-power access point cluster.

62. The method of claim 59, wherein the adjustment of the at least one communication capability comprises adjusting at least one parameter at the first low-power access point.

63. The method of claim 62, wherein the at least one parameter comprises at least one of: a power parameter, a handover parameter, a spectrum usage parameter, and a backhaul resource parameter.

64. The method of claim 59, wherein the traffic demand is indicated by at least one of: a quantity of user registrations, a quantity of calls, total data throughput carried over the first low-power access point per unit time, data throughput per user, data throughput per connection, channel element usage statics, or a percentage of time the first low-power access point meets or exceeds a resource limitation.

65. The method of claim 59, wherein each of the low-power access points has a maximum transmit power that is less than a maximum transmit power of any macro access point in a defined coverage area.

66. The method of claim 59, wherein the low-power access points comprise femtocells and/or picocells.

67. An apparatus for communication, comprising:

means for determining whether traffic demand at a first low-power access point is greater than or equal to a traffic threshold;

means for communicating with at least one second low-power access point to provide, to the at least one second low-power access point, an indication of whether the traffic demand at the first low-power access point is greater than or equal to the traffic threshold; and means for adjusting at least one communication capability of the first low-power access point in corroboration with the at least one second low-power access point as a result of the communication.

68. The apparatus of claim 67, further comprising means for receiving at least one indication of at least one traffic demand determination made by the at least one second low-power access point, wherein the adjustment of the at least one communication capability of the first low-power access point is further based on the received at least one indication.

69. The apparatus of claim 67, wherein the adjustment of the at least one communication capability comprises adjusting at least one parameter at the first low-power access point.

70. The apparatus of claim 69, wherein the at least one parameter comprises at least one of: a power parameter, a handover parameter, a spectrum usage parameter, and a backhaul resource parameter.

71. The apparatus of claim 67, wherein the traffic demand is indicated by at least one of: a quantity of user registrations, a quantity of calls, total data throughput carried over the first low-power access point per unit time, data throughput per user, data throughput per connection, channel element usage statics, and a percentage of time the first low-power access point meets or exceeds a resource limitation.

72. A non-transitory computer-readable storage medium storing instructions that, when executed by a processor, cause the processor to perform operations comprising:

computer-readable medium comprising code for causing a computer to:

determine, at a first low-power access point, whether traffic demand at the first low-power access point is greater than or equal to a traffic threshold;

communicate with at least one second low-power access point to provide, to the at least one second low-power access point, an indication of whether the traffic demand at the first low-power access point is greater than or equal to the traffic threshold; and adjust at least one communication capability of the first low-power access point in corroboration with the at least one second low-power access point as a result of the communication.

73. The non-transitory computer-readable storage medium of claim 72, wherein:
- receive at least one indication of at least one traffic demand determination made by the at least one second low-power access point; and
- the adjustment of the at least one communication capability of the first low-power access point is further based on the received at least one indication.

74. The non-transitory computer-readable storage medium of claim 72, wherein the adjustment of the at least one communication capability comprises adjusting at least one parameter at the first low-power access point.

75. The non-transitory computer-readable storage medium of claim 74, wherein the at least one parameter comprises at least one of: a power parameter, a handover parameter, a spectrum usage parameter, and a backhaul resource parameter.

76. The non-transitory computer-readable storage medium of claim 72, wherein the traffic demand is indicated by at least one of: a quantity of user registrations, a quantity of calls, total data throughput carried over the first low-power access point per unit time, data throughput per user, data throughput per connection, channel element usage statics, and a percentage of time the first low-power access point meets or exceeds a resource limitation.

\* \* \* \* \*